United States Patent
Bock

(10) Patent No.: US 8,755,467 B2
(45) Date of Patent: Jun. 17, 2014

(54) METHOD AND CIRCUIT SYSTEM FOR DECIDING A SYMBOL UPON RECEPTION OF RECEIVED SYMBOLS COUPLED WITH A QUADRATURE SIGNAL PAIR

(75) Inventor: Christian Bock, Freiburg (DE)

(73) Assignee: Entropic Communications, Inc., San Diego, CA (US)

( * ) Notice: Subject to any disclaimer, the term of this patent is extended or adjusted under 35 U.S.C. 154(b) by 762 days.

(21) Appl. No.: 12/276,023

(22) Filed: Nov. 21, 2008

(65) Prior Publication Data

US 2009/0135967 A1 May 28, 2009

(30) Foreign Application Priority Data

Nov. 22, 2007 (DE) .......................... 10 2007 056 490

(51) Int. Cl.
*H03D 1/00* (2006.01)
*H04L 27/06* (2006.01)

(52) U.S. Cl.
USPC ............ 375/340; 375/285; 375/346; 375/371

(58) Field of Classification Search
USPC ........... 375/340, 285, 346, 371, 344; 455/296
See application file for complete search history.

(56) References Cited

U.S. PATENT DOCUMENTS

| | | | |
|---|---|---|---|
| 4,827,431 A | 5/1989 | Goldshtein | |
| 7,088,978 B2 * | 8/2006 | Hui et al. ...................... | 455/296 |
| 7,668,269 B2 * | 2/2010 | Ma et al. ...................... | 375/350 |
| 2004/0218706 A1 | 11/2004 | Bougeard et al. | |
| 2008/0123788 A1 * | 5/2008 | Wongwirawat et al. ...... | 375/348 |

FOREIGN PATENT DOCUMENTS

| | | |
|---|---|---|
| EP | 1201066 | 9/2003 |
| EP | 1523146 | 4/2005 |
| EP | 1523144 | 8/2006 |
| WO | 01/80511 | 10/2001 |

* cited by examiner

*Primary Examiner* — Jean B Corrielus
(74) *Attorney, Agent, or Firm* — Richard Bachand; Duane Morris LLP

(57) ABSTRACT

The invention relates to a method and a circuit system for deciding a symbol (S) upon reception of received symbols coupled with a quadrature signal pair (I, Q). For deciding a symbol upon reception of an input signal using received symbols (S) coupled with a quadrature signal pair, wherein phase noise (PN) and Gaussian noise (GN) are superimposed on at least one such received symbol, the phase noise (PN) as well as the Gaussian noise (GN) are determined or estimated for at least one such received symbol (S). This is advantageously achieved by the fact that when the phase noise (PN) and the Gaussian noise (GN) are determined or estimated, a differentiation is made between the phase noise (PN) and the Gaussian noise, and a result of the differentiating determination or estimation is used for controlling reception parameters for decisions concerning subsequently received symbols (S). In particular, the measured values of the phase noise (PN) are orthogonalized to the Gaussian noise (GN).

20 Claims, 3 Drawing Sheets

METHOD AND CIRCUIT SYSTEM FOR DECIDING A SYMBOL UPON RECEPTION OF RECEIVED SYMBOLS COUPLED WITH A QUADRATURE SIGNAL PAIR

BACKGROUND OF THE INVENTION

The invention relates to a method and a circuit system for deciding a symbol upon reception of received symbols coupled with a quadrature signal pair.

Depending on the modulation method used, such as quadrature amplitude modulation (QAM), for such a method or in such a circuit system each symbol is fixedly associated with a specified nominal point from a plurality of nominal points in a plane defined by a quadrature signal pair. Each of the plurality of nominal points is associated, in polar coordinates, with a nominal angle and a nominal radius from a plurality of nominal angles and nominal radii, at least one such nominal point typically being situated on each of the plurality of nominal radii. Thus, for a reception point of such a received symbol a correspondingly associated symbol for the modulation method used may be decided.

In reality, however, such received symbols are superimposed by phase noise and additives, i.e., Gaussian noise, as the result of which it is not always possible to decide the associated symbol.

EP 1 201 066 B1 improves the situation, using the assumption that the phase noise and Gaussian noise may also be determined or estimated to a limited extent from such a received symbol. For this purpose, signals which are associated with external symbols of the alphabet for the modulation method employed are used for measuring the phase noise. Signals which are associated with internal symbols of the modulation alphabet are used for measuring the additive Gaussian noise. However, the resulting measured values have only limited suitability for complete correction of the noise, since signals having a large radius are also influenced by the Gaussian noise, and signals having a small radius are also distorted by phase noise.

EP 1 523 144 A2 generally describes a circuit system in which a received signal is converted from Cartesian coordinate space to polar coordinates in order to decide symbols in polar coordinate space, using a decider. Among other factors, a weighting factor for weighting a radius error and/or a weighting factor for weighting an angle error, or, for a phase error, for weighting radius and phase errors, is used.

EP 1 523 146 A2 generally describes a circuit system in which an estimated phase rotation angle is determined by forming an integral of plausible angular differences being sought.

BRIEF SUMMARY OF THE INVENTION

The object of the present invention is to provide a method and a circuit system which, for deciding a symbol upon reception of an input signal using received symbols coupled with a quadrature signal, reduce the influence of phase noise and Gaussian noise, preferably to such an extent that a symbol decision is enabled under all conditions of additive Gaussian noise and phase noise which theoretically still allow reception.

This object is achieved using a method and a circuit system described herein.

Accordingly, a method is preferred for deciding a symbol upon reception of an input signal using received symbols coupled with a quadrature signal pair. Phase noise and Gaussian noise are superimposed on at least one such received symbol, the phase noise as well as the Gaussian noise being determined or estimated for at least one such received symbol. When the phase noise and the Gaussian noise are determined or estimated, a distinction or differentiation is made between the phase noise and the Gaussian noise, and a result of the differentiating determination or estimation is used for controlling reception parameters for decisions concerning subsequently received symbols.

It is thus possible to determine symbols, ideally under all conditions of additive, i.e., Gaussian, noise and phase noise which theoretically only just allow reception, provided that a corresponding finely adjustable control is also implemented. In particular the remaining or high-frequency components of the amplitude fluctuations or phase fluctuations are used for estimating the Gaussian noise and phase noise.

Thus, the starting approach is that Gaussian noise and phase noise are to be measured separately, whereby the available measured values do not exactly represent the noise variables, as shown in FIG. 6, since when Gaussian noise is present a curve appears containing measured values of the Gaussian noise. In other words, in addition to Gaussian noise, which is externally supplied thermally, for example, some phase noise, produced from a tuner, for example, is also erroneously measured. Amplitude fluctuations as measured values gn may be measured which are produced only by Gaussian noise GN. Phase fluctuations as further measured values pn may be measured which are produced by phase noise PN and, to a slight extent, by Gaussian noise. The following expression is valid:

$$GN = gn \text{ and}$$

$$pn = PN + alpha\, GN,$$

where alpha is the crosstalk of the Gaussian noise on the measurement of the phase fluctuations. This finding is used in the present case, resulting in $$PN = pn - alpha\, GN$$

from a mathematical standpoint.

For the differentiating determination or estimation of the phase noise and Gaussian noise, such a received symbol is preferably rotated for phase correction, using a previously estimated phase rotation angle, and applied to a first decider which decides on a Cartesian basis and a second decider which decides on a polar basis for determining in each case a first or second phase error and/or a first or second radius error, respectively. Thus, the first phase error as well as the first radius error could be estimated by the first decider on the basis of a Cartesian decision, and the second phase error as well as the second radius error could be estimated by the second decider on the basis of a polar decision. This allows incremental or even stepless control of the reception parameters.

A "decider which decides on a Cartesian basis" is understood in particular to mean a decider which receives a symbol that is applied in Cartesian coordinates and decides in this Cartesian coordinate system. A "decider which decides on a polar basis" is understood in particular to mean a decider which receives a symbol that is applied in polar coordinates and decides in this polar coordinate system. The second decider may be a decider which decides on a strictly polar basis in polar coordinates. Preferred, however, is a Cartesian decider which is also able to make polar decisions in polar coordinates. For example, a decider which decides on a combined polar and Cartesian basis may be used, as known as such from EP 1 523 144 A2, in which the second decider combines a polar distance with a Cartesian distance.

For determining the phase rotation angle or a phase difference, and/or for determining a frequency difference for frequency control, the first phase error determined on a Cartesian basis and the second phase error determined on a polar basis are preferably mixed, and/or a switch is made between the first and the second phase errors. In this regard, "mixing" means in particular the weighted addition of the two variables to be mixed. Ideally, a phase noise may thus be adequately measured or corrected without having to make a correction for an additional influence of the Gaussian noise.

For determining a radius error as a control variable for an amplitude correction of the quadrature signal pair, the first radius error determined on a Cartesian basis and the second radius error determined on a polar basis are preferably mixed, and/or a switch is made between the first and the second radius errors. Gaussian noise may thus be easily measured or corrected, wherein two radius errors which are determined on a Cartesian or polar basis, i.e., differently determined, are available for the correction, thereby increasing the speed and accuracy of an adjustment.

In the case of a remaining response of the phase noise to the Gaussian noise after the phase noise is determined or estimated after determining or estimating the Gaussian noise and correcting same, it is particularly preferred to orthogonalize measured values or determined or estimated values of the phase noise and of the Gaussian noise, using a control unit. In particular, the first or second phase error or a phase difference determined therefrom is orthogonalized to the first or second radius error or to a radius error determined therefrom. Such orthogonalization may be performed using the control unit, in particular by subtracting the measured values or by solving a corresponding linear equation system.

Use is thus made of the finding that the measured values for noise component determination of the phase noise and of the Gaussian noise or variables obtained therefrom are not orthogonally superimposed, either in the plane of the Cartesian coordinates or in the plane of the polar coordinates, and allows orthogonalization corresponding to an improved correction of the noise influence.

The Gaussian noise is preferably determined or estimated using a decision made on the basis of a radial difference of a radial component of the received symbol. For this purpose a circuit system and a procedure, or aspects from the description thereof, known as such from EP 1 523 144 A2, may be advantageously used. The disclosure of EP 1 523 144 A2 in particular is therefore also incorporated herein by reference for supplemental explanation.

For determining or estimating the phase noise it is preferred to use received or decided symbols only on at least one outer radius, or to use received or decided symbols on at least one outer radius which are more strongly weighted than received or decided symbols on at least one inner radius. Such a procedure is known as such, but improves the determination of the noise components in a simple manner.

For determining or estimating the phase noise it is preferred to use, in particular to track, one pass of a phase rotation angle, whereby the phase rotation angle corresponds to one rotation of a coordinate system of a decider for deciding the symbol relative to a coordinate system of the input signal. A simple procedure for this purpose consists in determining or tracking the phase rotation angle by integration of phase differences and/or angular deviations. According to one comparatively improved embodiment variant, the phase rotation angle is determined using an integral of sought or plausible angular differences, which is known as such from EP 1 523 144 A2. The disclosure of EP 1 523 144 A2 in particular is therefore also incorporated herein for supplemental explanation.

The integral is preferably formed by adding contiguous angular deviations in the phase rotation angle having a single delay. Such a procedure is easily implemented and improves the determination of the noise components in a simple manner. However, the integral may also be formed by adding angular differences in the phase rotation angle having a multiple delay to contiguous angular differences. Further improvement in the determination of the noise components may be achieved by the greater delay when the effect of the Gaussian noise on the phase noise is too severe, since the corresponding circuit is thus less sensitive to the Gaussian noise.

A combination of the various procedures is particularly advantageous. If the orthogonalization or diagonalization is not sufficient for correcting the measured value of the phase noise using the direct measured values, more than two input variables may be used for the evaluation, such as, for example, the absolute differences of the phase rotation angle, obtained from plausible angular deviations, between large delays and angular deviations weighted using a large radius. This only requires the corresponding weighting of symbols and/or the solution of a correspondingly modified or expanded equation system, using the control unit.

A circuit system which allows such a method to be carried out is independently advantageous. Accordingly, a circuit system is preferred for deciding a symbol upon reception of an input signal using received symbols coupled with a quadrature signal, whereby phase noise and Gaussian noise are superimposed on at least one such received symbol. The circuit system has an apparatus and/or control system for determining or estimating the phase noise as well as the Gaussian noise of the at least one such received symbol, and has a regulating system and/or regulation-control system for regulating reception parameters for decisions concerning subsequently received symbols. The circuit system is advantageously [characterized] in that the apparatus and/or control system for determining or estimating the phase noise as well as the Gaussian noise is designed or controlled for carrying out the determination or estimation of the phase noise and the Gaussian noise in a manner which differentiates between the phase noise and the Gaussian noise, and is connected to the regulating system and/or regulation-control system for applying a result of the differentiated determination or estimation to the regulating system and/or regulation-control system for regulating the reception parameters. For the differentiated determination or estimation of the phase noise and the Gaussian noise, the circuit system is preferably provided with a rotator for phase-correcting rotation of such a received symbol, using in particular a previously estimated phase rotation angle, having a first decider, downstream from the rotator, which decides on a Cartesian basis and is designed and/or programmed for determining a first phase error and/or a first radius error, and having a second decider, downstream from the rotator, which decides at least on a polar basis and is designed and/or programmed for determining a second phase error and/or a second radius error.

The circuit system is preferably provided with a changeover switch and/or mixer which is designed and/or programmed to mix the first phase error determined on a Cartesian basis and the second phase error determined on a polar basis for determining the phase rotation angle or a phase difference, and/or to switch between the first and the second phase errors and to output a phase difference for a phase control module of a phase control loop. The circuit system is preferably additionally or alternatively provided with a changeover switch and/or mixer which is designed and/or programmed to mix the first phase error determined on a Cartesian basis and the second phase error determined on a polar basis for determining a frequency difference for frequency control, and/or or to switch between the first and the second phase errors and to output a phase difference for a frequency control module of a frequency control loop.

The circuit system is preferably provided with an apparatus for determining a radius error as a control variable for an amplitude correction module for correcting the Gaussian noise of the quadrature signal pair, having a changeover switch and/or mixer which is designed and/or programmed to mix the first radius error determined on a Cartesian basis and the second radius error determined on a polar basis for determining the radius error, and/or to switch between the first and the second radius errors.

The circuit system is preferably provided with a control unit which, after determination or estimation of the Gaussian noise and correction thereof, in the case of a remaining response of the phase noise to the Gaussian noise after determination or estimation of the phase noise is designed and/or programmed to orthogonalize to the Gaussian noise measured values or determined or estimated values of the phase noise and the Gaussian noise, in particular to orthogonalize the first or second phase error or a phase difference determined therefrom to the first or second radius error or a radius error determined therefrom. The control unit is preferably integrated into a corresponding circuit, but may also be designed as an external control unit.

The circuit system for determining or estimating the phase noise is preferably [provided] with a delay system which is designed and/or programmed to track one pass of a phase rotation angle using delay elements connected in series, in each case a subtraction element being connected for forming a difference between the input and output of one of the delay elements associated with the subtraction element, and the delay system being connected or programmed to apply a sum of absolute values of these differences to a control unit as a measure of the phase noise.

The circuit system is preferably designed, programmed, and/or used for carrying out such a method.

According to the particularly preferred circuit system or procedure, in particular two measures are carried out: firstly, a measurement which differentiates between the two types of noise and optionally orthogonalizes measured values, and secondly, an incremental or stepless control of the reception parameters.

BRIEF DESCRIPTION OF THE SEVERAL VIEWS OF THE DRAWINGS

One exemplary embodiment is explained in greater detail below with reference to the drawings.

DETAILED DESCRIPTION OF THE INVENTION

Figure 1:
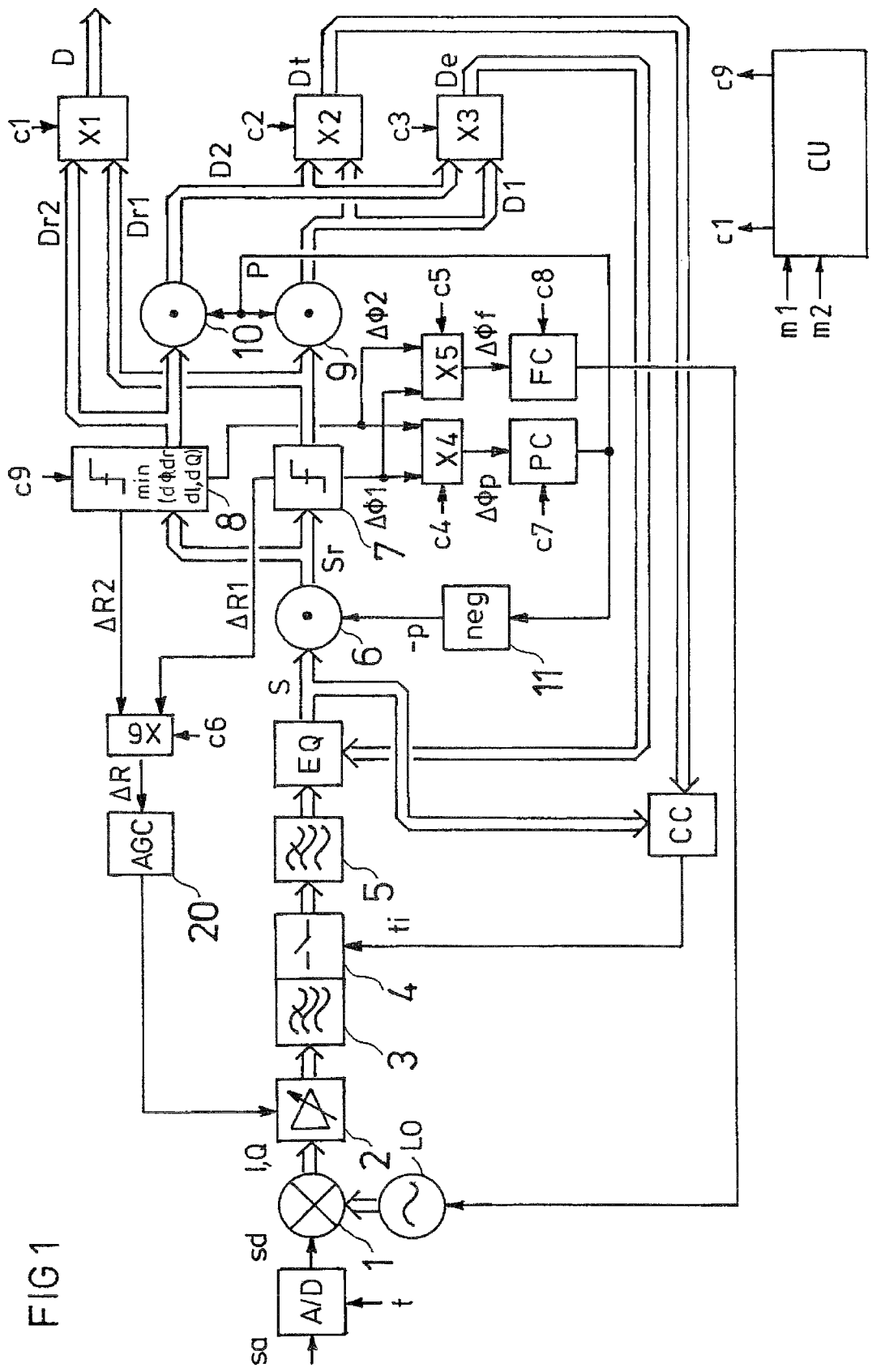
FIG. 1 shows a circuit system having components by way of example for deciding a symbol upon reception of an input signal, whereby received symbols are coupled with a quadrature signal pair, and such received symbols are superimposed with phase noise and Gaussian noise.

FIG. 1 shows a circuit system by way of example, in which a received analog reception signal sa is inputted as an initiating component to an analog/digital converter A/D to which a clock signal t is applied. The analog/digital converter A/D converts the analog reception signal sa to a digitalized or digital signal sd. The digital signal sd is outputted to a quadrature converter or mixer 1 which converts the digitalized or digital signal sd to the baseband and splits same into the quadrature components of the quadrature signal pair I, Q. The signal outputted by the mixer 1 is applied to a gain controller 2 in a manner known as such. A signal amplified by the gain controller 2 is fed to a low-pass filter 3, the output signal from which is fed to a scanner 4 at which a scanning cycle ti is present for scanning. A signal thus scanned by the scanner 4 is outputted to a further low-pass filter 5 in the form of a Nyquist filter, and is filtered by same and applied to an equalizer EQ.

The equalizer EQ outputs received signal values, i.e., received symbols S, to a rotator 6, to which an estimated phase rotation angle $-\rho$ is additionally applied. Using the estimated phase rotation angle $-\rho$ from the received symbols S, a sequence of correctively rotated received symbols Sr is generated around the particular estimated phase rotation angle $-\rho$ by means of a corresponding rotation by the estimated phase rotation angle, and is outputted by the rotator 6.

The rotated received symbols Sr are applied to a first decider 7, which makes a decision on the basis of Cartesian coordinates, and to a second or additional decider 8, which makes a decision in particular also on the basis of polar coordinates. For the particular applied rotated, received symbol Sr the first decider 7 correspondingly decides a phase-correcting, rotated symbol Dr1 on a Cartesian basis and outputs same. For the particular applied rotated, received symbol Sr the second decider 8 correspondingly generates a phase-correcting, rotated second symbol Dr2 decided on a polar basis and outputs same.

As the second decider 8, for the polar decision a decider may be used in particular which first makes a Cartesian auxiliary decision and selects a plurality of adjacent reception points as candidates for a final decision. In the second decider having such a design the radius error and phase error are subsequently computed for each candidate and are correspondingly weighted for current settings which may optionally be used. The point having the lowest weighted error is then outputted as a decided second symbol Dr2. Ideally, the weighted errors are computed in such a second decider 8 for all possible reception points in order to select the best point, although for reducing the computational complexity a limited number of adjacent points may be considered for estimating the decided second symbol Dr2.

A system composed of a single rotator 6 is described by way of example, which on the basis of Cartesian coordinates performs the rotation of the received symbols S, for which purpose a complex multiplication, including a determination of the sine and the cosine of the phase rotation angle $\rho$, must then be performed. Alternatively, the rotation may also be performed in polar coordinates by means of a simple angular addition.

The phase-correcting, rotated symbols Dr1, Dr2 decided in this manner by the two deciders 7, 8 are applied to a changeover switch X1, which outputs a decided symbol D. The decided symbol D is outputted to additional circuits for further data processing in a manner known as such. As the decided symbol D, the phase-correcting, rotated first symbol Dr1 decided on a Cartesian basis by the first decider 7, or alternatively, the phase-correcting, rotated second symbol Dr2 decided on a polar basis by the second decider is outputted by switching the data output of the changeover switch X1. The data, i.e., decided symbols D, outputted in this manner may be further processed in an error correction block, for example. The switching in the changeover switch X1 is performed using a control signal c1 which is outputted by a control unit CU. The control unit CU is advantageously an integral component of the circuit system, but in principle may also be implemented by an external control unit.

The phase-correcting, rotated first and second symbols Dr1, Dr2 decided on a Cartesian and polar basis, respectively, are also applied to a further rotator 9 and 10, respectively, which perform a reverse rotation about the estimated phase rotation angle ρ and correspondingly output a Cartesian reverse-rotated, i.e., nonphase-corrected, first decided symbol D1 and a polar reverse-rotated, i.e., nonphase-corrected, second decided symbol D2.

The two reverse-rotated symbols D1, D2 are applied to a further changeover switch and/or mixer X2, to which a corresponding control signal c2 is also applied by the control unit CU. Depending on the applied control signal c2, the changeover switch and/or mixer X2 performs switching over or mixing of the decided symbols D1, D2 reverse-rotated in this manner, and outputs a cycle control symbol Dt. For further processing, the cycle control symbol Dt or a corresponding sequence of the cycle control symbols Dt is applied to a correlator CC in a manner known as such for determining the symbol rate and symbol phase for controlling the analog/digital converter and/or a scanning rate converter or the scanner 4. The sequence of the received symbols S is also applied to the correlator CC in a manner known as such. In the illustrated embodiment, the correlator CC correspondingly generates the scanning cycle ti and applies same to the analog/digital converter A/D or to the scanner 4. Alternatively, the clock signal ti may also control the analog/digital converter A/D, in which case the scanning rate converter in the scanner 4 is not necessary.

The two reverse-rotated symbols D1, D2 are also applied to a further changeover switch and/or mixer X3. Using a further control signal c3 which is provided by the control unit CU and is applied to this changeover switch and/or mixer X3, a changeover or mixture of the two reverse-rotated symbols D1, D2 is carried out, corresponding to the signal state, for generating the equalizer control symbol De for further processing in the equalizer EQ and for generating a fault voltage for a feed forward equalizer and a decision feedback equalizer as well as for the necessary decided symbols for the decision feedback equalizer. Using this changeover switch and/or mixer X3, an equalizer control symbol De is correspondingly provided for controlling the equalizer EQ as a function of the control signal c3 and the two applied Cartesian or polar reverse-rotated symbols D1 or D2.

The first decider 7 also provides a phase error $\Delta\Phi 1$, decided on a Cartesian basis in the first decider 7, between the instantaneously applied rotated received symbol Sr and the symbol Dr1 which is rotated therefrom for phase correction and decided on a Cartesian basis. The second decider 8 also provides a phase error $\Delta\Phi 2$, decided on a polar basis in the second decider 8, between the instantaneously applied rotated received symbol Sr and the symbol Dr2 which is rotated therefrom for phase correction and decided on a Cartesian basis.

The two decided phase errors $\Delta\Phi 1$, $\Delta\Phi 2$ are applied to a further changeover switch and/or mixer X4. As a function of a further control signal c4 which is provided by the control unit CU, this changeover switch and/or mixer performs a changeover or mixture of the phase errors $\Delta\Phi 1$, $\Delta\Phi 2$ or the decided phases, and outputs a selected phase difference $\Delta\Phi p$ for a phase control loop. For further processing, the selected phase difference $\Delta\Phi p$ is applied to a phase control module PC which is actuated by a further control signal c7 via the control unit CU. The phase control module PC is used to define or provide the coefficients of the plausibility filter for controlling the tilt or phase rotation angle ρ. The phase rotation angle ρ is used, as described, for rotation of the received symbols S or for reverse rotation of the decided symbols Dr1, Dr2.

The selected phase difference $\Delta\Phi p$ is thus used for further processing in a block for phase rotation of the signals, i.e., symbols S, upstream from the deciders 7, 8 and for a counterrotation of the decided symbols Dr1, Dr2 or the fault voltages from the deciders 7, 8, regardless of whether the rotator 6 is located upstream or downstream from a Nyquist filter, the feed forward equalizer, or the decision feedback equalizer. This is also independent of whether the counterrotator or counterrotators are located upstream or downstream from the above-described changeover switches or mixers X2, X3, and independent of whether decided symbols or fault voltages equivalent thereto are rotated.

The two phase errors $\Delta\Phi 1$, $\Delta\Phi 2$ decided on a Cartesian or polar basis are also applied to a further changeover switch and/or mixer X5 which is actuated by the control unit CU by means of a further control signal c5. As a result of the control signal c5, depending on the signal state a changeover or mixture of the two phase errors $\Delta\Phi 1$, $\Delta\Phi 2$ decided on a Cartesian or polar basis or their equivalent for the decided phases is achieved, and a selected frequency difference $\Delta\Phi f$ is correspondingly outputted for a frequency control loop. The selected frequency difference $\Delta\Phi f$ is applied to a frequency control module FC, which provides a control signal for a local oscillator LO. The local oscillator LO outputs two carriers, offset by 90°, to the mixer 1, so that the mixer 1 receives the digital signal sd for providing the two quadrature components I, Q. The frequency control module FC is controlled by a further control signal c8 via the control unit CU. This control signal c8 results in control of the parameters of the frequency control block or frequency control modules FC, in particular control of the filter coefficients of a PI filter integrated therein for controlling the frequency of the local oscillator LO.

The first decider 7 also outputs a first radius error $\Delta R1$, decided in the Cartesian decider 7, as a difference in the absolute values of the rotated received signal Sr and the symbol Dr1 decided by the first decider 7. The second decider 8 correspondingly outputs a second radius error, decided therein on a polar basis, as the difference in the absolute values of the received rotated symbol Sr and the symbol Dr2 decided by the second decider 8. The two decided radius errors $\Delta R1$, $\Delta R2$ are applied to a further changeover switch and/or mixer X6. This changeover switch and/or mixer X6 outputs a radius error $\Delta R$, independently of a further control signal c6 applied by the control unit CU, by changing over or mixing the two decided radius errors $\Delta R1$, $\Delta R2$ or radii decided equivalently thereto for further processing in a circuit for amplitude control. This changeover switch and/or mixer in particular outputs the radius error ΔR, obtained by switching over or mixing, to an amplitude correction module 20 which, for example, performs automatic gain control AGC by correspondingly providing a control signal for the gain controller 2.

According to one particularly preferred embodiment, the control unit CU also outputs a further control signal c9 which is applied to the second decider 8 for controlling the parameters of the second decider 8, which also acts in the polar coordinate system. Using this control signal c9, control in particular of the addition ratio of the phase error ΔΦ and the radius error ΔR upon which the distance decision is made, and optionally a mixture of Cartesian deviations, is carried out.

The control unit CU may in particular be provided or programmed and may operate with a table or with different tables for the various blocks to be controlled, or with an equation which specifies the ratio of Gaussian noise to phase noise, or with several such equations, or with a combination of such means. The control parameters, i.e., control signals $c_1, c_2, \ldots, c_9$, of the control unit CU may be simultaneously or independently provided, and in a corresponding manner may simultaneously or independently control the particular actuated components. In particular, the control signals $c_1, \ldots, c_9$ may in each case provide two, or advantageously even more, positions for Gaussian noise or phase noise. In particular for a mixture instead of a changeover, for the corresponding components or mixers a control signal $c_1, \ldots, c_9$ may also be provided in each case which advantageously enables continuous control.

It is also possible to use such a circuit system in particular in conjunction with complex digital modulation methods such as QAM. Application possibilities result in particular for new radio, television, and data services via cable, and in some cases also via land-based transmissions.

When fault voltages are described, unless indicated otherwise these are determined by the difference between the particular applied signal upstream from the decider 7, 8 and the associated decided symbol.

In the circuit system, which preferably may be used as an independent component of a receiver, it is preferred for all deciding functional blocks and modules to be designed and/or programmed in such a way that the best possible reception parameters may be set for each noise combination. This is achieved as a function of the phase noise PN and the degree of Gaussian noise GN. The more application possibilities that are provided with in particular small increments or continuous adjustment capability for the individual control blocks, etc., the better the use which may be made of a decision of symbols until reaching the limit region of the reception which is just possible for a specified ratio of the phase noise PN to the Gaussian noise GN.

Figure 2:
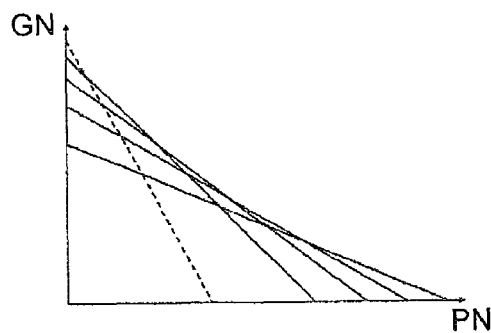
FIG. 2 shows a schematic illustration of a reception limit with various parameter sets for a receiver for Gaussian noise compared to phase noise.

FIG. 2 schematically illustrates reception limits with various parameter sets for different ratios of Gaussian noise GN to phase noise PN. An optimal parameter set for Gaussian noise is illustrated by a dashed line.

Figure 3:
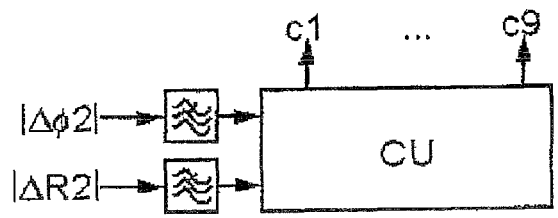
FIG. 3 schematically shows a control unit of a circuit system according to FIG. 1, with input values which may be used by way of example.

As shown in FIG. 3, measurement results of the Gaussian noise GN and phase noise PN are supplied to the control unit CU, which generates the parameters, i.e., control signals, $c_1, \ldots, c_9$ for the various reception blocks of the circuit according to FIG. 1, and optionally also generates further control signals. For this purpose, in particular the phase error ΔΦ2 decided on a polar basis in the second decider 8 and the radius error ΔR2 decided on a polar basis by the second decider 8 are each applied to the control unit CU via a low-pass filter. The control unit CU thus receives measured values, in particular such which result from radius and amplitude differences on the basis of the decision using the polar decider.

Figure 4:
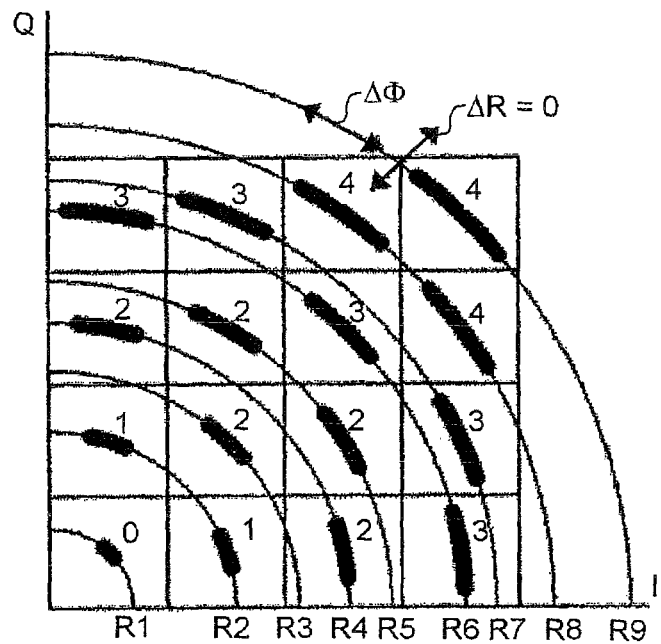
FIG. 4 shows a complex-value plane of the quadrature signal pair with nominal radii and reception regions, specified by phase noise, for received symbols.

FIG. 4 shows nominal radii in the Cartesian plane of the quadrature signal pair Q, I, with symbol positions on nominal radii. It is noted that when viewed in polar coordinates, the phase error, i.e., the angular deviation ΔΦ, does not generate amplitude errors, and the amplitude error ΔR, i.e., the measured variable or measured value gn thereof, is correspondingly a good indicator of Gaussian noise GN. The angular deviation ΔΦ or the measured value pn thereof may be used for measuring the phase noise PN. However, the measured variable for this measured value pn is influenced by additive noise, i.e., Gaussian noise GN. The results are improved by multiplying the angular deviation ΔΦ by values from a table, the outer radii being preferred and control being performed either by the decided or nondecided symbols or by the decided or nondecided radii. Examples of weighting factors are associated with the particular nominal positions; for example, an innermost symbol is weighted with the factor 0, and a symbol on the outer radii is weighted with the factor 4. Such multiplication of the fault voltages by symbol- or radius-dependent values may once again be performed on the basis of values from a corresponding table.

Alternatively, the pass of the phase rotation angle ρ, which represents the tilting of the coordinate system of the decider with respect to that of the input signal, may be tracked for measurement of the phase noise. In one simple design the phase rotation angle ρ is merely the integral of the angular deviation ΔΦ. According to one improved embodiment, sought, in particular plausible, angular differences according to EP 1 523 146 may be used for the integral.

In one simple system the absolute values of adjacent angular differences are added, for which purpose a single delayer $z^{-1}$ is used.

Figure 5:
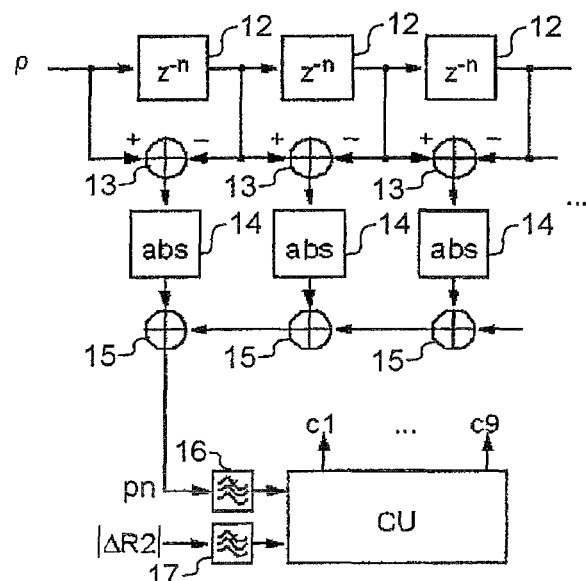
FIG. 5 shows a delay system for determining a measure of the phase noise.

This method may be improved by using the delay elements having a greater delay $z^{-n}$. A corresponding circuit system is thus made more insensitive to Gaussian noise. Such a circuit system is shown by way of example in FIG. 5. The phase rotation angle ρ is applied to a series connection of delay elements 12, each of which results in a preferably greater, or in particular also adjustable, delay $z^{-n}$. The input and the output of each of the delay elements 12 is connected to a respectively associated subtraction element 13 in order to determine the difference in the input and output values of each of the delay elements 12. The differences are each applied by the subtraction elements 13 to an absolute value generator element 14 for forming the absolute value thereof. The absolute values thus formed are added using an addition element 15 or a chain of addition elements 15 in order to determine a measure, i.e., the measured value pn, of the phase noise PN. This value is applied to the control unit CU via a low-pass filter 16 which also receives a corresponding applied amplitude error ΔR2, likewise from the second decider 8.

If the indicator, i.e., measured value pn, which is to measure the phase noise PN still responds to Gaussian noise to a certain extent, the control unit CU or another corresponding, suitable circuit may orthogonalize the two measured values by subtraction, in particular by solving a linear equation system.

Figure 6:
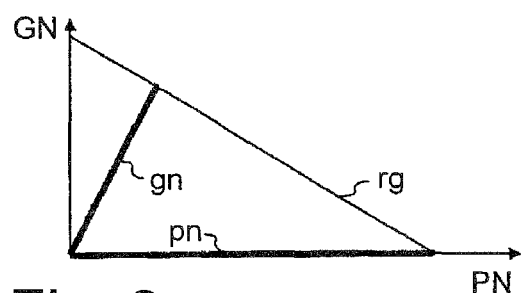
FIG. 6 shows a diagram for illustrating the influence of Gaussian noise on the phase noise.

FIG. 6 shows by way of example an illustration of the Gaussian noise GN plotted as a function of the phase noise PN. The measured value pn for the phase noise PN of a symbol S is on the abscissa, which represents the component of the general phase noise PN of a received symbol. Also illustrated is a measured value gn for Gaussian noise of symbol S, up to a line which connects the two axes as a theoretical reception limit rg. It is shown that the Gaussian noise also produces a response from the indicator for the phase noise. Orthogonalization results in corresponding independent indicators.

If this orthogonalization is not adequate, and independent measured variables cannot be achieved therefrom for the Gaussian noise and the phase noise of a received symbol S, or cannot be achieved with sufficient resolution, more than two single measured variables may be used. Thus, the measured variables for multiple successive symbols S may be used. However, variables derived from the measured variables of a symbol S may also preferably be used, for example the radius error ΔR, the absolute differences of the tilting obtained from plausible angular deviations, or the phase rotation angle ρ between large delays $z^{-1}$ and the angular deviations ΔΦ weighted using the radius.

The remaining or high-frequency components of the amplitude fluctuations, i.e., phase fluctuations, are preferably used for estimating the Gaussian noise GN and the phase noise PN. However, the measured values gn or pn thus obtained are not completely independent of one another. The measurement of the amplitude fluctuation as measured value gn for the Gaussian noise GN is not influenced by a phase noise PN, whereas the measurement of the phase fluctuations, i.e., angular deviations, may very well be caused by Gaussian noise GN. The following expressions apply:

gn=GN and pn=PN+alpha GN where alpha is a variable of the equation system. By solving this linear equation, orthogonal measured variables for the Gaussian noise GN and the phase noise PN may be determined according to GN=gn and PN=pn−alpha GN.

The invention claimed is:

1. A circuit system for deciding a symbol upon reception of received symbols coupled with a quadrature signal, whereby phase noise and Gaussian noise are superimposed on at least one of the received symbols, the circuit system comprising:
an apparatus for determining or estimating the phase noise and the Gaussian noise of the at least one of the received symbols;
a regulating system for regulating reception parameters for decisions concerning subsequently received symbols,
wherein the apparatus for determining or estimating the phase noise and the Gaussian noise performs the determination or estimation of the phase noise and the Gaussian noise in a manner which differentiates between the phase noise and the Gaussian noise, and is connected to the regulating system for applying a result of the differentiated determination or estimation to the regulating system for regulating the reception parameters, and
wherein the apparatus for determining or estimating the phase noise and the Gaussian noise comprises:
a rotator for phase-correcting rotation of the at least one of the received symbols, using a previously estimated phase rotation angle,
a first decider, downstream from the rotator, which decides on a Cartesian basis and determines a first phase error and/or a first radius error, and
a second decider, downstream from the rotator and parallel to the first decider, which decides at least on a polar basis and determines a second phase error and/or a second radius error.

2. The circuit system according to claim 1, further comprising: changeover circuitry for determining the phase rotation angle or a phase difference, mixing the first phase error determined on a Cartesian basis and the second phase error determined on a polar basis, or switching between the first and the second phase errors and to output the phase difference for a phase control module of a phase control loop, wherein the changeover circuitry mixes the first phase error determined on a Cartesian basis and the second phase error determined on a polar basis.

3. The circuit system according to claim 2, wherein the apparatus for determining or estimating the phase noise and the Gaussian noise-is configured to determine a radius error as a control variable for an amplitude correction module for correcting the Gaussian noise of the quadrature signal, and includes changeover circuitry for determining the radius error by mixing the first radius error determined on a Cartesian basis and the second radius error determined on a polar basis or by switching between the first and the second radius errors.

4. The circuit system according to claim 1 further comprising changeover circuitry for determining a radius error as a control variable for an amplitude correction module for correcting the Gaussian noise of the quadrature signal, the changeover circuitry determining the radius error by mixing the first radius error determined on a Cartesian basis and the second radius error determined on a polar basis or by switching between the first and the second radius errors.

5. The circuit system according to claim 4, further comprising a control unit which, after determination or estimation of the Gaussian noise and correction thereof, orthogonalizes the determined or estimated values of the phase noise and the Gaussian noise.

6. The circuit system according to claim 1 further comprising a control unit which, after determination or estimation of the Gaussian noise and correction thereof, orthogonalizes the determined or estimated values of the phase noise and the Gaussian noise.

7. The circuit system according to claim 1, further comprising a delay system for determining or estimating the phase noise by tracking one pass of a phase rotation angle using delay elements connected in series, each of the delay elements, a respective subtraction element being connected for forming a difference between the input and output of respective one of the delay elements associated with the subtraction element, and the delay system being connected or programmed to apply a sum of absolute values of these differences to a control unit as a measure of the phase noise.

8. The circuit according to claim 1, wherein the apparatus for determining or estimating the phase noise and the Gaussian noise further differentiates between the phase noise and the Gaussian noise and uses a result of the differentiated determination or estimation for controlling reception parameters for decisions concerning subsequently received symbols.

9. A method for deciding a symbol upon reception of symbols coupled with a quadrature signal pair, the method comprising the steps of:
determining or estimating phase noise and the Gaussian noise for the at least one of the received symbols, the phase noise and Gaussian noise being superimposed on the at least one of the received symbols; and
when the phase noise and the Gaussian noise are determined or estimated, differentiating between the phase noise and the Gaussian noise;
using a result of the differentiated determination or estimation for controlling reception parameters for decisions concerning subsequently received symbols;

wherein the differentiated determination or estimation of the phase noise and the Gaussian noise comprises:

rotating the at least one of the received symbols for phase correction, using a previously estimated phase rotation angle;

applying the at least one of the received symbols to a first decider which decides on a Cartesian basis and determines a first phase error and/or a first radius error; and applying the at least one of the received symbols to a second decider which decides on a polar basis and determines a second phase error and/or a second radius error.

10. The method according to claim 9, wherein for determining the phase rotation angle or a phase difference, and/or for determining a frequency difference for frequency control, mixing the first phase error determined on a Cartesian basis and the second phase error determined on a polar basis or a switching between the first and the second phase errors.

11. The method according to claim 9, wherein for determining a radius error as a control variable for an amplitude correction of the quadrature signal pair, mixing the first radius error determined on a Cartesian basis and the second radius error determined on a polar basis or a switching between the first and the second radius errors.

12. The method according to claim 11, wherein a remaining response of the phase noise to the Gaussian noise after the phase noise is determined or estimated after determining or estimating the Gaussian noise and correcting same, orthogonalizing measured values or determined or estimated values of the phase noise and of the Gaussian noise, using a control unit.

13. The method according to claim 11, wherein a remaining response of the phase noise to the Gaussian noise after the phase noise is determined or estimated after determining or estimating the Gaussian noise and correcting same, orthogonalizing the first or second phase error or a phase difference determined therefrom to the first or second radius error or to a radius error determined therefrom.

14. The method according to claim 9, wherein a remaining response of the phase noise to the Gaussian noise after the phase noise is determined or estimated after determining or estimating the Gaussian noise and correcting same, orthogonalizing measured values or determined or estimated values of the phase noise and of the Gaussian noise, using a control unit.

15. The method according to claim 9, wherein the Gaussian noise is determined or estimated using a decision made on the basis of a radial difference of a radial component of the received symbols.

16. The method according to claim 9, wherein for determining or estimating the phase noise, using the received or decided symbols only on at least one outer radius, or using the received or decided symbols on at least one outer radius which are more strongly weighted than the received or decided symbols on at least one inner radius.

17. The method according to claim 9, wherein the step of determining or estimating the phase noise further comprises tracking one pass of a phase rotation angle, and matching the tracked pass to one rotation of a coordinate system of a decider for deciding the symbol relative to a coordinate system of the received symbols.

18. The method according to claim 17, wherein an integral is formed by adding contiguous angular deviations in the phase rotation angle having a single delay.

19. The method according to claim 17, wherein an integral is formed by adding angular differences in the phase rotation angle having a multiple delay to contiguous angular differences.

20. The method according to claim 9, wherein a remaining response of the phase noise to the Gaussian noise after the phase noise is determined or estimated after determining or estimating the Gaussian noise and correcting same, orthogonalizing the first or second phase error or a phase difference determined therefrom to the first or second radius error or to a radius error determined therefrom.

* * * * *